US009937841B2

(12) United States Patent
Garing et al.

(10) Patent No.: US 9,937,841 B2
(45) Date of Patent: Apr. 10, 2018

(54) FRICTION BUSHING

(71) Applicant: B/E Aerospace, Inc., Wellington, FL (US)

(72) Inventors: Francis Xavier Garing, Atlanta, GA (US); Benjamin D. Stephens, Atlanta, GA (US); Mark A. Kruse, Atlanta, GA (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/661,128

(22) Filed: Mar. 18, 2015

(65) Prior Publication Data

US 2015/0267757 A1    Sep. 24, 2015

Related U.S. Application Data

(60) Provisional application No. 61/954,876, filed on Mar. 18, 2014.

(51) Int. Cl.
| | |
|---|---|
| *B23B 13/12* | (2006.01) |
| *B60N 3/00* | (2006.01) |
| *B60N 2/68* | (2006.01) |
| *B60N 2/44* | (2006.01) |
| *B64D 11/06* | (2006.01) |
| *F16C 11/04* | (2006.01) |

(52) U.S. Cl.
CPC ............ *B60N 3/004* (2013.01); *B60N 2/444* (2013.01); *B60N 2/4435* (2013.01); *B60N 2/682* (2013.01);

(Continued)

(58) Field of Classification Search
CPC .......... E21B 19/12; E21B 19/10; E21B 19/07; F15B 15/262; Y10T 279/17119;
(Continued)

(56) References Cited

U.S. PATENT DOCUMENTS 1,538,442 A * 5/1925 Mann .................... B23B 13/125
279/20.1
1,707,218 A * 4/1929 Butrick ................. B23B 13/125
279/20.1

(Continued)

FOREIGN PATENT DOCUMENTS

| DE | 201 20 266 U1 | 4/2003 |
|---|---|---|
| WO | 98/45607 A2 | 10/1998 |

(Continued)

OTHER PUBLICATIONS

European Search Report for EP Patent Application No. 15 76 5269 dated Oct. 19, 2017.

*Primary Examiner* — Bradley T King
*Assistant Examiner* — Stephen M Bowes
(74) *Attorney, Agent, or Firm* — Shumaker, Loop, Kendrick, LLP

(57) ABSTRACT

A friction bushing for being positioned on a shaft for friction-retarded rotation relative to the shaft, including a housing having a bore for receiving the shaft and a flange plate positioned on the housing around the bore. A plurality of flanges are carried by the flange plate and adapted for extending axially outwardly from the flange plate and along circumferentially-spaced apart areas of the shaft for frictionally-engaging axially-extending areas of the shaft.

6 Claims, 4 Drawing Sheets

(52) U.S. Cl.
CPC ........ *B64D 11/064* (2014.12); *B64D 11/0638* (2014.12); *B64D 11/0643* (2014.12); *B64D 11/0644* (2014.12); *B60N 2205/20* (2013.01); *F16C 11/04* (2013.01)

(58) Field of Classification Search
CPC ................ Y10T 82/2579; Y10T 16/05; Y10T 403/3933; Y10T 403/4634; Y10T 403/4637; Y10T 403/4642; Y10T 403/3941; Y10T 403/3981; B23B 13/123; B23B 13/125; F16C 29/02; F16C 33/20; F16C 33/04; A47C 7/70
See application file for complete search history.

(56) References Cited

U.S. PATENT DOCUMENTS

| | | | | |
|---|---|---|---|---|
| 1,983,950 A * | 12/1934 | Sheffer | ................. | B23B 13/125 279/20.1 |
| 2,071,138 A * | 2/1937 | Nolan | .................... | B23B 13/123 279/146 |
| 2,741,482 A * | 4/1956 | Abramoska | ........... | B23B 13/125 279/20.1 |
| 3,643,765 A * | 2/1972 | Hanchen | ................ | F15B 15/262 188/170 |
| 3,829,184 A * | 8/1974 | Chevret | ................... | F16C 11/04 16/2.1 |
| 4,078,778 A * | 3/1978 | Hubweber | ............ | F16F 9/0254 188/170 |
| 2002/0057953 A1* | 5/2002 | Krohlow | ................ | F02M 35/04 411/72 |
| 2005/0058375 A1* | 3/2005 | Ma | .......................... | F16C 33/20 384/276 |
| 2009/0110338 A1* | 4/2009 | Blase | ...................... | F16C 33/08 384/296 |

FOREIGN PATENT DOCUMENTS

WO            01/62541 A1     8/2001
WO    WO 03052283 A2 *    6/2003           F16C 27/02

* cited by examiner

FRICTION BUSHING

CROSS-REFERENCE TO RELATED APPLICATION

This application claims priority from U.S. patent application No. 61/954,876 filed Mar. 18, 2014, the entirety of which is incorporated by reference herein.

TECHNICAL FIELD AND BACKGROUND OF THE INVENTION

This invention relates to a friction bushing that provides resistance against rotation of, for example, an arm mounted onto the bushing around a shaft passing through the bushing. The novel friction bushing has use in numerous applications and in particular, friction bushings used on aircraft passenger seats to control the amount of force used to raise or lower meal trays, seat backs, leg rests and the like.

In this application the disclosed friction bushing is designed so that the resistance is created by friction resulting from pressure against a shaft by a plurality of flanges projecting off of the bushing along the axial direction of the shaft. The flanges are radially arranged around the shaft to impart resistance at multiple points on the shaft.

SUMMARY OF THE INVENTION

It is therefore an object of the present invention to provide a friction bushing that provides constant resistance to relative rotation of a shaft carried in the bushing.

It is another object of the present invention to provide a friction bushing that provides variable resistance to relative rotation of a shaft carried in the bushing.

It is another object of the invention to provide a friction bushing that provides resistance to relative rotation of the shaft at multiple points around the shaft.

These and other objects and advantages of the invention are achieved by providing a friction bushing for being positioned on a shaft for relative rotation, including a housing having a bore for receiving the shaft, a flange plate positioned on the housing, and a plurality of flanges carried by the flange plate and adapted for extending axially along radially-spaced apart areas of the shaft for frictionally-engaging axially-extending areas of the shaft.

According to one embodiment of the invention, an annular clip is provided for being positioned around the flanges for applying radially-directed additional resistance to the flanges.

According to another embodiment of the invention, a series of lobes extends axially along the shaft that vary the resistance to relative rotation between the shaft and the flanges.

These and other objects and advantages of the invention are achieved by providing a friction bushing for being positioned on a shaft for friction-retarded rotation relative to the shaft, which includes a housing having a bore for receiving the shaft, a flange plate positioned on the housing around the bore, and a plurality of flanges carried by the flange plate and adapted for extending axially outwardly from the flange plate and along circumferentially-spaced apart areas of the shaft for frictionally-engaging axially-extending areas of the shaft.

According to another embodiment of the invention, the flanges are integrally-formed on the flange plate.

According to another embodiment of the invention, the flanges are integrally-formed on the flange plate and the flange plate is integrally-formed on the housing.

According to another embodiment of the invention, the flanges include respective enlarged terminal portions.

According to another embodiment of the invention, the enlarged terminal end portions of the flanges are thicker in a radially-extending direction than non-terminal portions of the flanges.

According to another embodiment of the invention, six flanges are formed on the flange plate.

According to another embodiment of the invention, the flanges collectively comprise two-thirds of the circumference of the bore and spaces between the flanges comprise one-third of the circumference of the bore.

According to another embodiment of the invention, the enlarged terminal portions comprise the outer 25 percent of the length of the flanges.

According to another embodiment of the invention, an annular clip is provided for being positioned around the flanges for applying radially-directed additional resistance to the flanges.

According to another embodiment of the invention, a plurality of radially-outwardly extending lobes extend axially along the shaft that incrementally vary the resistance to relative rotation between the shaft and the flanges.

According to another embodiment of the invention, a friction bushing is provided for being positioned on a shaft for friction-retarded rotation relative to the shaft, and includes a housing having a bore for receiving the shaft, a flange plate positioned on the housing around the bore, and a plurality of flanges integrally-formed on the flange plate and adapted for extending axially outwardly from the flange plate and along circumferentially-spaced apart areas of the shaft for frictionally-engaging axially-extending areas of the shaft. Respective enlarged terminal portions are formed on an outer end of each of the flanges.

According to another embodiment of the invention, a friction bushing is provided for being positioned on a shaft for friction-retarded rotation relative to the shaft, that includes a housing having a bore for receiving the shaft. A flange plate is positioned on the housing around the bore, and a plurality of flanges are carried by the flange plate and adapted for extending axially outwardly from the flange plate and along circumferentially-spaced apart areas of the shaft for frictionally-engaging axially-extending areas of the shaft. The flanges collectively comprise two-thirds of the circumference of the bore and spaces between the flanges comprise one-third of the circumference of the bore. Respective enlarged terminal portions are formed on an outer end of each of the flanges that are thicker in a radially-extending direction than non-terminal portions of the flanges.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
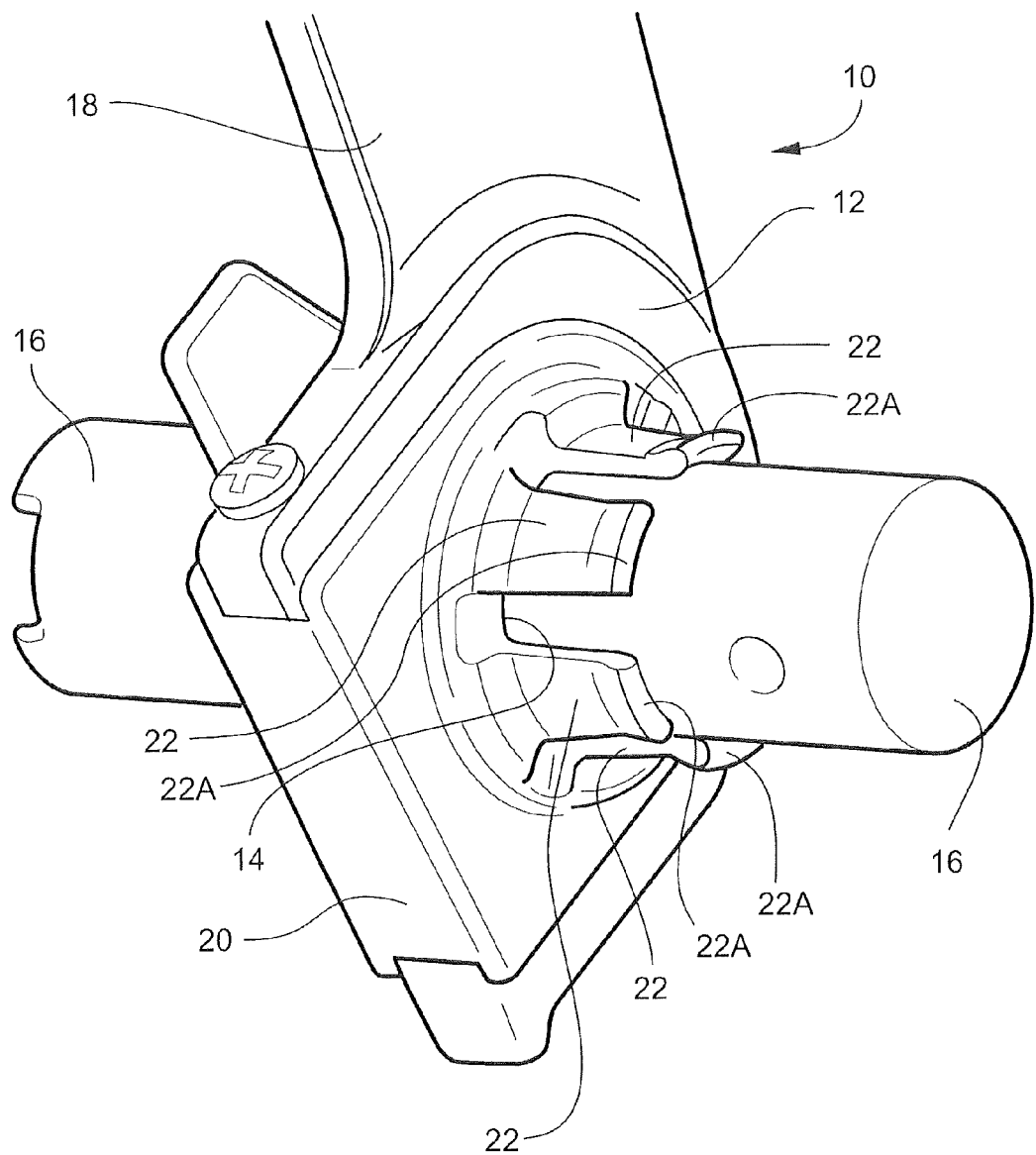
FIG. 1 is a perspective view of a friction bushing according to a preferred embodiment of the invention.
Figure 2:
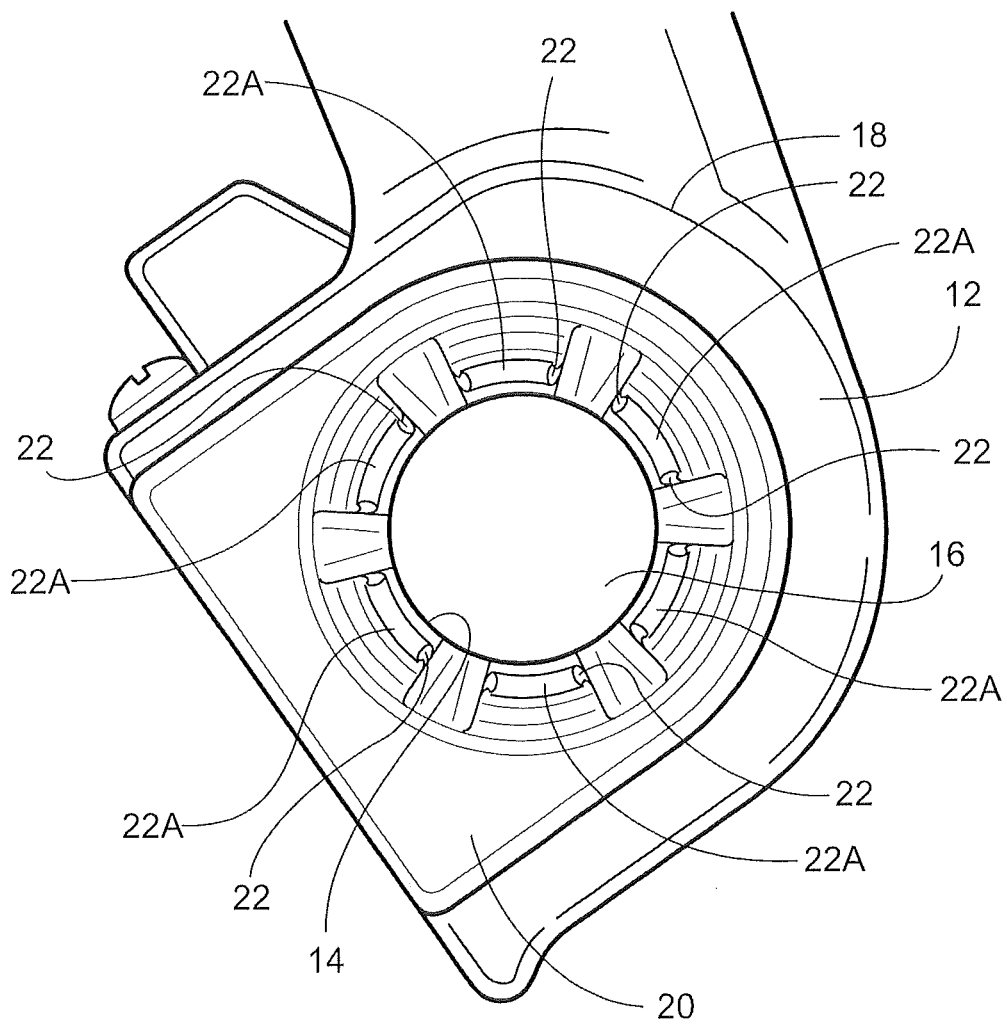
FIG. 2 is an end elevation of the friction bushing of FIG. 1, showing the radial arrangement of friction flanges around the shaft.

Referring now to FIGS. 1 and 2 of the drawings, a bushing 10 is shown that includes a housing 12 with a bore 14 through which is positioned a shaft 16. The bushing 10 may operate whereby the housing 12 is stationary and the shaft 16 rotates relative to the housing 12. Alternatively, and as is illustrated in FIG. 1, the shaft 16 is stationary and the bushing housing 12 rotates relative to the stationary shaft 16. In FIG. 1, the housing 12 carries an arm 18 that may be connected to an aircraft seat component such as a meal tray, not shown. The housing 12 also carries a flange plate 20 positioned circumferentially around the shaft 16. The flange plate 20 includes a series of axially-extending flanges 22 that are sized to engage the shaft 16 in such manner as to retard in a controlled manner the relative rotation of the shaft 16 in the bore 14. The degree of retardation of rotation is a function of the shaft material and surface finish, the material and surface finish of the contact surfaces of the flanges 22 and the degree of radially-directed force applied by the flanges 22 to the shaft 16. The degree of radially-directed force applied by the flanges 22 is also function of the thickness of the flanges, both in absolute terms and the relative thickness along their length. The flanges 22 in the particular embodiment shown in FIGS. 1-3 include respective enlarged terminal portions 22A on the outer, free ends.

Figure 3:
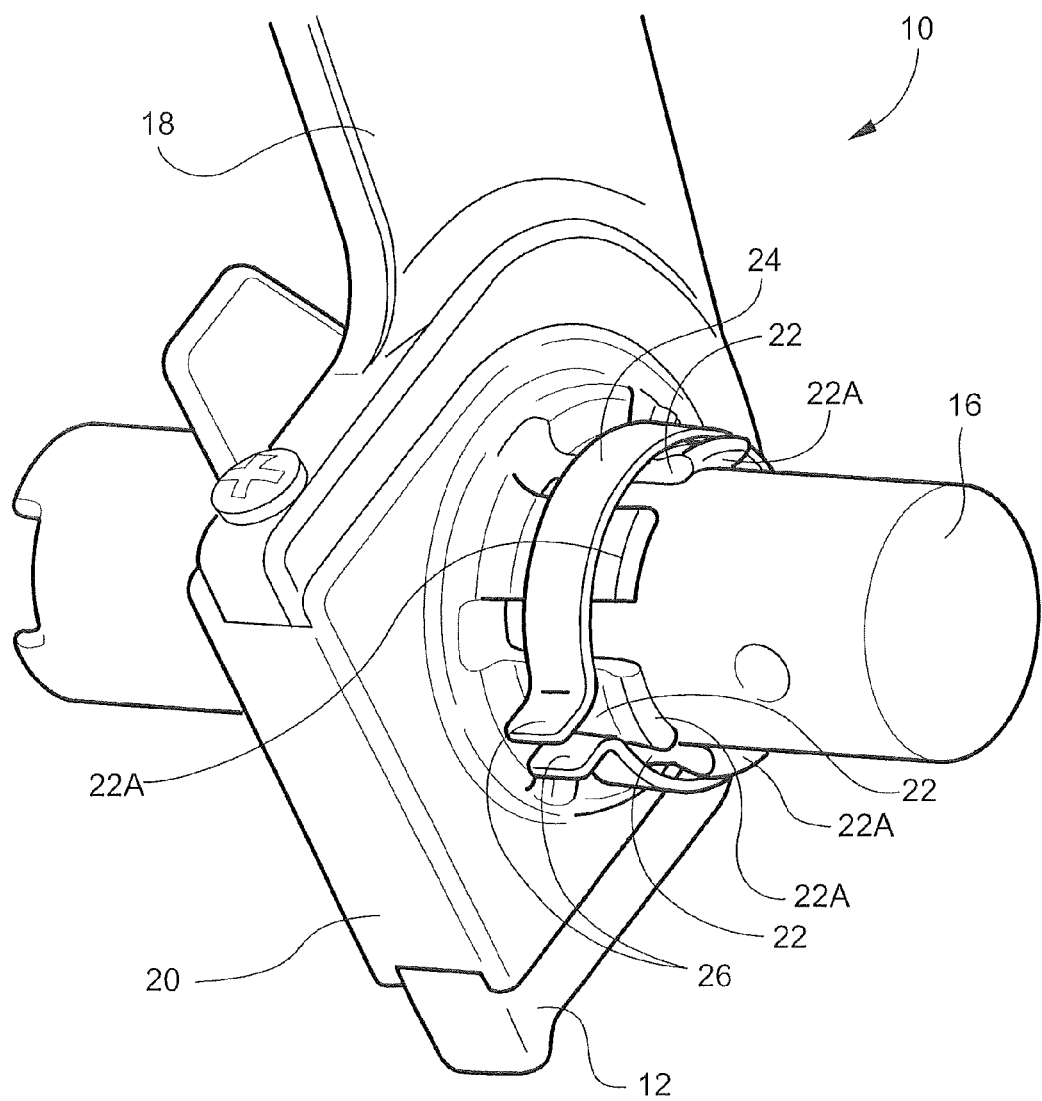
FIG. 3 is a perspective view of an alternative embodiment of the friction bushing according to the invention that includes an optional spring clip that can be positioned around the flanges to provide a specific level of increased resistance.

Referring now to FIG. 3, an optional annular clip 24 is shown installed over the flanges 22. The clip 24 can be either installed over an end of the shaft 16, or spread and installed radially from a side over the flanges 22. The enlarged terminal portions 22A of the flanges 22 aid in preventing the clip 24 from sliding off of the ends of the flanges 22. A pair of outwardly-projecting ears 26 can be provided to assist in manipulating the clip 24. The size of the clip 24, its material and surface finish determine the degree of additional frictional resistance provided. The degree of friction added can also be increased by utilizing an alligator or other type of clamp to force the ears 26 of the clip 24 together. The degree of resistance is determined empirically.

Figure 4:
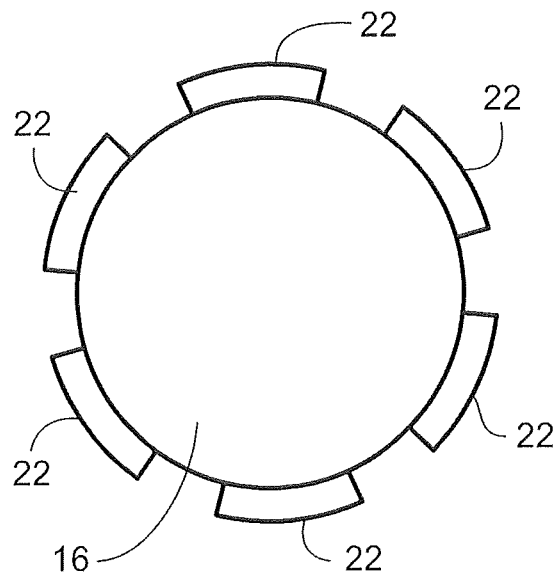
FIG. 4 is a schematic end view of a shaft on which is mounted a flange that provides constant resistance as the shaft rotates in the bushing.

Referring now to FIG. 4, the shaft 16 and the flanges 22 illustrate that constant resistance is obtained by the shaft 16 having a regular circumference with the same radius at all radial positions.

Figure 5:
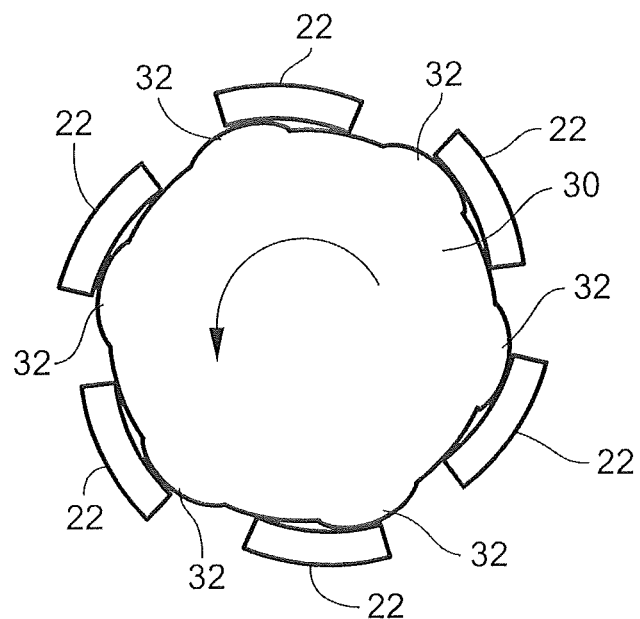
FIG. 5 is a schematic end view of a shaft on which is mounted a flange that provides variable resistance as the shaft rotates in the bushing.

In contrast, as shown in FIG. 5 a variable resistance can be obtained by providing a shaft 30 that has a series of lobes 32 extending axially along its outer surface that have the effect of varying the resistance as relative rotation between the shaft 30 and the flanges 22 of the bushing 10. This feature provides an incremental degree of rotational movement whereby a user can repeatedly move the shaft 30 and whatever is carried on the shaft to the same position. The flanges 22 warp slightly, ride up over the lobes 32 and settle into the circumferential areas of the shaft 30 between the lobes 32.

According to one preferred embodiment of the invention, friction bushing has six (6) flanges 22. While the flanges 22 may be provided with widths and lengths suitable for any particular need, according to one preferred embodiment, the flanges 22 collectively comprise two-thirds of the circumference of the bore 14 and spaces between the flanges 22 comprise one-third of the circumference of the bore 14. According to one preferred embodiment, the enlarged terminal portions 22A comprise the outer 25 percent of the length of the flanges 22. According to one preferred embodiment, the lobes 32 comprise 25 percent of the circumference of the shaft 30.

A friction bushing according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A method for friction-retarded actuation of a passenger airplane cabin component, comprising:
    providing a friction bushing, including;
    a flange plate adapted to mount to a base rigidly coupled to the passenger airplane cabin component, the flange plate defining a substantially planar surface, wherein an aperture is defined in the planar surface and characterized by a circular perimeter adapted to align with an axis through a center of a bore hole in the base, wherein the flange plate includes at least two wall members adapted to engage the base and extend from one side of the base to the other, wherein;
    a first wall member attaches to the substantially planar surface and is perpendicular to the substantially planar surface, and a second wall member is arranged to be substantially parallel to the substantially planar surface and attached to the first wall member, such that the flange plate is adapted to wrap around and be attached to the base, and
    a plurality of flange members carried by the flange plate, each of the flange members extending axially outwardly from the flange plate and along circumferentially-spaced apart areas, wherein each of the flange members forms a cantilevered friction member that is adapted to exert, upon introduction of a shaft, a force on the shaft;
    attaching the friction bushing to the shaft, wherein each of the flange members is adapted to apply a radially-inward force to the shaft caused by forces internal to the flange member which resist bending of the flange member imparted by the shaft; and
    actuating the passenger airplane cabin component by applying force to rotate the base with respect to the shaft within the friction bushing, wherein the radially-inward force applied by each of the flange members is adapted to retard rotation of the shaft, thereby controlling an amount of force needed to actuate the passenger airplane cabin component.

2. The method according to claim 1, wherein the flange plate includes at least two wall members adapted to engage the base and extend from one side of the base to the other, wherein a first wall member attaches to the substantially planar surface and is perpendicular to the substantially planar surface, and a second wall member is arranged to be substantially parallel to the substantially planar surface and attached to the first wall member, such that the flange plate is adapted to wrap around and be attached to the base.

3. The method according to claim 1, wherein the flange members include respective enlarged terminal portions.

4. The method according to claim 3, wherein the enlarged terminal portions of the flange members are thicker in a radially-extending direction than non-terminal portions of the flange members.

5. The method according to claim 3, wherein the enlarged terminal portions of the flange members comprise about the outer 25 percent of the length of the flange members.

6. The method according to claim 3, wherein the flange members collectively comprise about two-thirds of a circumference of the bore hole and spaces between the flange members comprise about one-third of a circumference of the bore hole.

* * * * *